US008439431B2

(12) United States Patent
Midoun et al.

(10) Patent No.: US 8,439,431 B2
(45) Date of Patent: May 14, 2013

(54) ATTACHMENT BRACKET FOR CONNECTING PERIPHERAL DEVICES TO A VEHICLE

(75) Inventors: Djamal Eddine Midoun, Ann Arbor, MI (US); Stephen Thomas Kozak, Northville, MI (US); Erika Kristin Low, Ann Arbor, MI (US); Bhimaraddi Venkaraddi Alavandi, Canton, MI (US); Shekar Prabhakar Erasala, Northville, MI (US); Robert Sharp, Troy, MI (US); Wanjun Lei, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 13/118,704

(22) Filed: May 31, 2011

(65) Prior Publication Data
US 2012/0306238 A1 Dec. 6, 2012

(51) Int. Cl.
*B60N 99/00* (2006.01)
(52) U.S. Cl.
USPC ..................................... 296/205; 296/184.1

(58) Field of Classification Search ............... 296/184.1, 296/193.02, 193.07, 203.01, 204, 205
See application file for complete search history.

(56) References Cited

U.S. PATENT DOCUMENTS

| | | | |
|---|---|---|---|
| 7,665,800 B2 * | 2/2010 | Werner | 296/184.1 |
| 2006/0175872 A1 * | 8/2006 | Wada | 296/193.07 |
| 2010/0320801 A1 * | 12/2010 | Kitai et al. | 296/187.08 |

* cited by examiner

*Primary Examiner* — Lori Lyjak
(74) *Attorney, Agent, or Firm* — Joseph E. Root

(57) ABSTRACT

An attachment bracket in a vehicle for providing integrated support for one or more security features required by law enforcement agencies. The attachment bracket includes a first part including a horizontal cross member extending across the top of a rear panel of the vehicle body. The structure further includes a second part, connected to the first part, which includes two or more intersecting cross members. The second part is mechanically coupled to the vehicle body inside the vehicle cabin below the second row passenger seat. The structure also includes a third part, connected to the second part, which includes one or more arcuate tubular members extending along the vehicle floor panel from the second part towards the first row of seats. The third part is open at the end towards the first row passenger seats.

9 Claims, 4 Drawing Sheets

ATTACHMENT BRACKET FOR CONNECTING PERIPHERAL DEVICES TO A VEHICLE

BACKGROUND

This application relates generally to vehicles, and more particularly to attachment brackets installed in vehicles.

For their patrolling fleet, law enforcement agencies, such as the police, require special equipment and vehicle design. For example, these agencies require special design considerations, such as racks and panels to store special communication equipment including radios, laptops, or satellite systems, as well as measures such as armored passenger seats for safely transporting potentially dangerous persons. In practice, police agencies and other similar agencies customize standard automobiles according to their needs. This process is time consuming and costly often requiring significant capital. In addition, the creation of custom installations for each patrol car renders the maintenance process more costly and difficult, further increasing capital requirements as well as operational and maintenance costs. Moreover, custom installations permanently modify and alter the vehicle. Due to such alterations, the vehicles are substantially devalued for subsequent lease or sale to civilian consumers.

In general, however, most law enforcement agencies require certain common features. For example, the police force requires security features such as strong passenger seats so that potentially dangerous objects are not able to disable the vehicle or driver or reach the trunk. Moreover, these vehicles should include secure handcuff attachments. Agency vehicles are also required to support communication equipment in the vehicle trunk as well as in the dashboard panel.

There remains, therefore, a need for a simple and cost effective vehicle design that allows customized installations without altering the basic vehicle structure.

SUMMARY

One embodiment of the present application describes an attachment bracket for a vehicle cabin. The vehicle cabin includes a first row of seats, a second row of seats, a floor panel, and a rear panel. The attachment bracket includes a first part including a horizontal cross member extending across the rear panel of the vehicle cabin. Further, the frame includes a second part which is connected to the first part. The second part includes two or more boomerang-shaped members. The central portions of the boomerang-shaped members meet in the center and are coupled to the center of the rear panel. The open ends of the boomerang-shaped members are mechanically coupled to the front and back ends of the rear panel. Additionally, the frame includes a third part, which is connected to the second part. The third part includes one or more arcuate tubular members extending along the floor panel from the second part towards the first row passenger seats. The third part is coupled to the second part at one end and includes one or more features at the other end to attach one or more devices.

Another embodiment of the present disclosure describes an attachment bracket for integrating a second row of passenger seats, a security partition, and an accessory package in police vehicles. The attachment bracket, attached to the vehicle chassis in the vehicle cabin, includes a first part having a cross member across the top of a rear panel of the vehicle. Further the attachment bracket includes a second part which is connected to the first part. The attachment bracket includes two or more tubular segments which are mechanically coupled to the rear panel of the vehicle. Additionally, the frame includes a third part which has two arcuate tubular segments with one tubular member connected to a left side end of the second part and the second tubular member being connected to a right side end of the second part. Part C extends from the second part toward a first row of passenger seats.

These and other embodiment, advantages, features, and objects of the present application will become apparent upon review of the following detailed description of the preferred embodiments when taken in conjunction with the drawings and the appended claims.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

Typically, law enforcement agencies customize civilian vehicles according to their special needs. Civilian vehicles, however, do not provide integrated structural support members that may be utilized to attach security features and accessories needed by law enforcement agencies. Therefore, these agencies must remove vehicle trimmings and accessories to weld or bolt the accessory equipment directly to the vehicle body. Embodiments of the present disclosure provide an integrated structure to connect after market security accessories to the vehicle's chassis or body without having to weld the accessories to the vehicle body. The integrated structure allows enforcement agencies to connect equipment such as a security partition between the first and second rows of passenger seats, communication trays in the trunk, hand rails to engage restraining devices, and passenger seats that block access to the vehicle's fuel reservoir. Moreover, the integrated structure may be coupled to the vehicle chassis without altering the chassis' design.

Exemplary System

Figure 1:
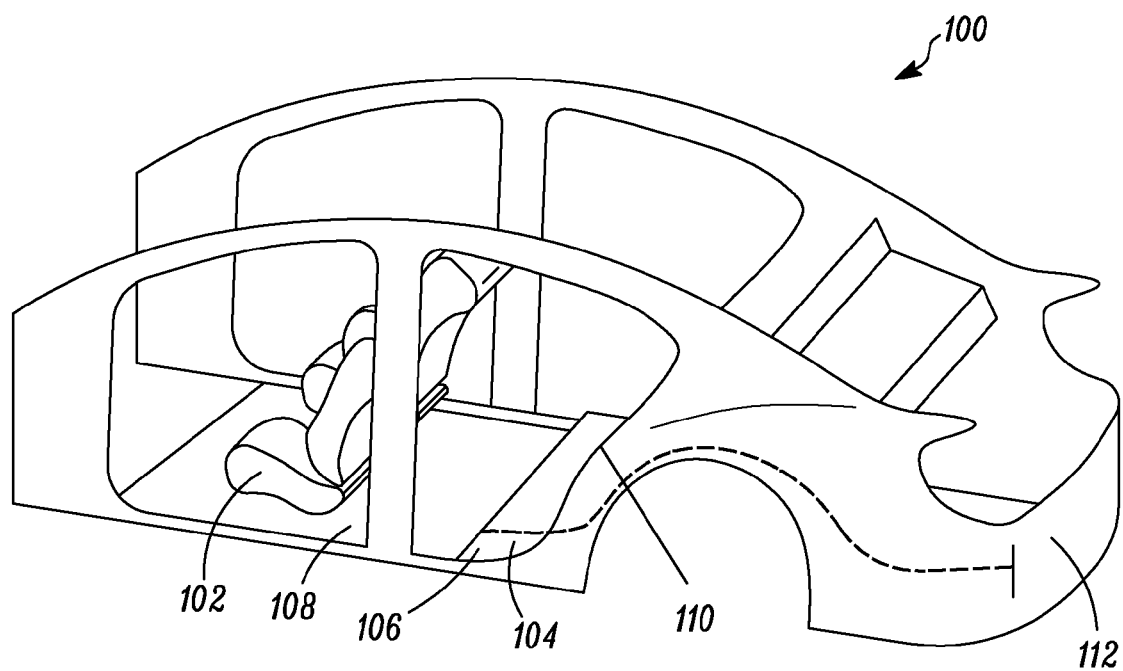
FIG. 1 illustrates a typical civilian vehicle.

FIG. 1 illustrates a typical civilian vehicle's 100 body and cabin. The cabin includes a first row of seats 102 and a second row of seats 104. Typically, the vehicle's floor is slightly raised towards the back of the vehicle (to make room for the fuel tank 106). This raised flooring is ideal for the second row of passenger seat 104, which are mounted on the raised floor. The vehicle's floor includes a floor panel 108 extending from the front of the vehicle cabin to the raised portion of the floor below the second row of seats 104. In some vehicles, the floor panel 108 may be fitted as a single sheet; while in others, the floor panel 108 may include two panels, one for each side of the cabin (left and right). In these vehicles, the central longitudinal portion of the vehicle floor may include a separate raised central panel, which covers the vehicle's drive shaft. A rear panel is mounted on the vehicle chassis from the raised portion of the vehicle floor to the rear end of the vehicle (typically the vehicle's trunk). The integrated attachment bracket introduced in the present disclosure may be mounted on the vehicle floor panel and rear panel between the first row of passenger seats and the rear end of the vehicle.

Figure 2:
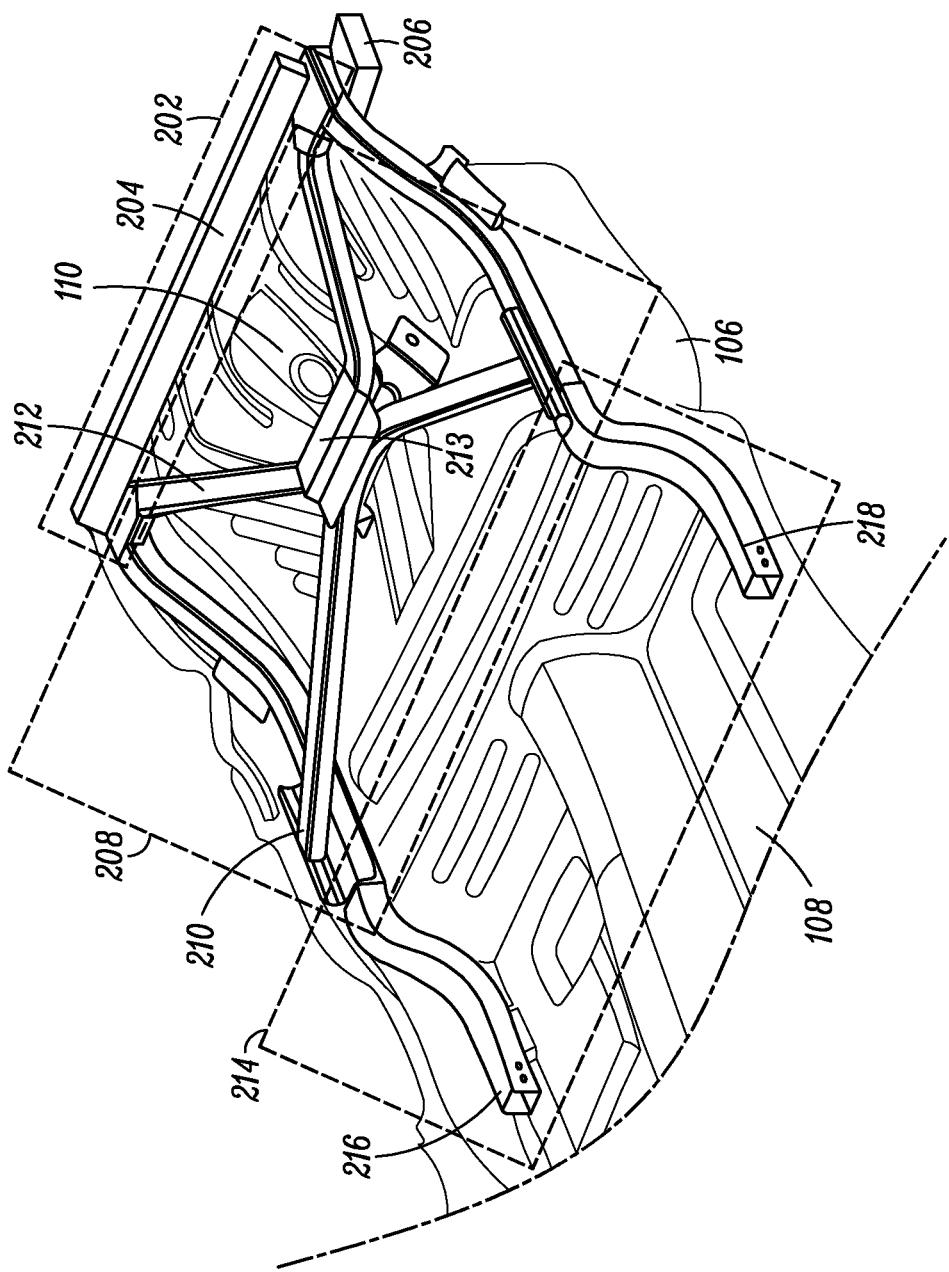
FIG. 2 illustrates a vehicle attachment bracket according to embodiment of the present disclosure.

FIG. 2 illustrates one such exemplary attachment bracket 200 that may be utilized by law enforcement agencies to connect security accessories to a vehicle. It will be understood that this attachment bracket 200 may be utilized for other applications as well without departing from the scope of the present disclosure. For example, the attachment bracket 200 may be utilized in taxis or other civilian vehicles to attach peripheral accessories such as separator screens.

Multiple tubular segments form the attachment bracket 200, which may be broadly divided into three functional sections—part A, B, and C. Part A 202 includes a cross member 204, which may be attached to the rear panel 110, preferably to the part of the rear panel 110 above the rear wheels 206. Part B 208 includes first and second tubular boomerang-shaped members 210 and 212. The two ends of the member 210 may be connected to the front left and right sides of the rear panel 110, while the two ends of member 212 may be coupled to the rear panel 110 just before part A 202. The central portions 213 of the boomerang-shaped members 210, 212 may meet in the center of the rear panel 110, and they may be mechanically joined using a suitable technique, such as bolting, or welding. This structure provides attachments for a seat surface, and for other peripheral devices, such as handcuffs or other restraining equipment. Moreover, as the boomerang-shaped members 210, 212 cover most of the rear panel 110, they block access to the fuel tank 106 from the second row of seats 104. Part C 214 includes one or more arcuate tubular structures extending along the floor panel 108 from part B 208 to the front of the vehicle cabin. This part includes one or more connection points to attach a structural partition 302 between the first and second row of seats. In FIG. 2, part C is illustrated as two tubular segments 216, 218 (one at each side of the vehicle cabin, extending from part B along the contour of the floor panel 108. Part C 214 may terminate before the first row of seats 102.

Permanent or temporary coupling techniques may be utilized to connect the three structures to each other and to the vehicle body. Examples of permanent techniques may include bolting, welding, or gluing. Temporary techniques may include snap-fitting or threadably connecting, for example, the various tubular segments.

In another embodiment, the attachment bracket 200 may be constructed of a single piece using any known forming technique such as hydroforming, or molding, without departing from the scope of the present disclosure. Alternatively, the structure may be made using a combination of large formed segments and small tubular segments. For example, Parts A, B, and C may each be a single segment, coupled to form the attachment bracket 200.

Any suitable material may be utilized to manufacture the attachment bracket 200; for example, the attachment bracket may be formed of metals, plastics, fiberglass, or any other material that does not break, bend, or deform under mechanical force applied by a human. In one embodiment, the attachment bracket is formed of high strength low alloy steel such as grade 550 steel, grade 350 steel, or a combination of both. The segments of the attachment bracket may have a substantially circular cross section in one embodiment. Alternatively, the segments may have different cross-sectional shapes; polygonal, triangular, rectangular, elliptical, or semi-circular can be employed without departing from the scope of the present disclosure.

Communication equipment, present in the trunk 112, may be attached to part A 202 to restrict movement of the equipment when the vehicle is in motion. For example, a cooling fan that cools the equipment in the trunk 112 may be attached to the horizontal cross member 204. In addition, features may be provided along part A 202 to install storage (drawer) devices for the communication equipment. Features may include holes for bolting devices, snap-fitting features, hooks, chains, etc. Moreover, other features that may fasten peripheral equipment to Part A 202 may also be contemplated.

The boomerang-shaped members 210, 212, as described previously, block access to the fuel tank 106 and any other electrical connections running under the second row of seats 104. Further, the second row of seats 104 may be attached onto part B 208. Typically, for police purposes, the second row of seats 104 is made or plastic, metal, or wood so that it may be hosed down or cleaned easily. Moreover, these materials prevent passengers from reaching the fuel tank 106 beneath the seat 104. According to embodiments of the present disclosure, any such seat may be permanently or temporarily attached to part B 208 without departing from the scope of the present disclosure. Alternatively, regular cloth and foam type seats may also be envisioned.

Further, the boomerang-shaped tubular members 210, 212 provide an attachment point for handcuffs or other restraining equipment. To this end, the attached second row of seats 104 may have openings or slits through which an officer may reach the tubular segments 210, 212 to latch the restraining devices. Alternatively, the restraining devices may be brought around the tubular segments 210, 212 and placed on the seat 104 beforehand for restraining felons once they are seated in the vehicle.

Figure 3:
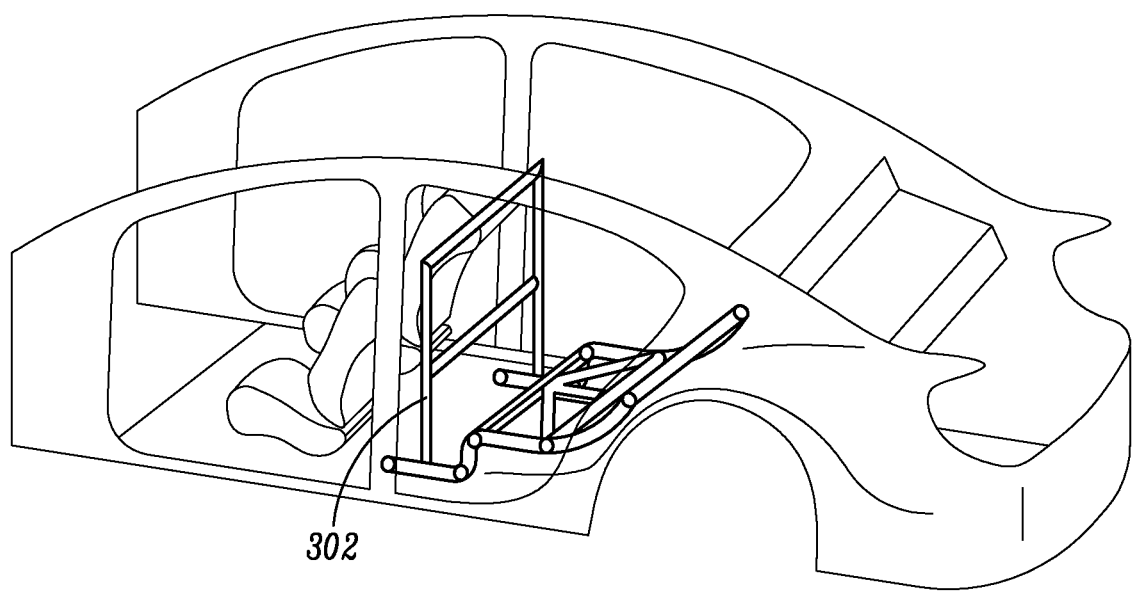
FIG. 3 illustrates the vehicle attachment bracket of FIG. 1 with a security partition according to embodiments of the present disclosure.

Part C 214 preferably extends from Part B 208 to the first row of seats 102. As described previously, the front portion may include connection means to attach a structural partition between the first row of seats 102 and the second row of seats 104. FIG. 3 illustrates one such partition 302 connected to part C. The partition, which may be bolted, welded, glued, snap-fitted, or threadably mounted on part C isolates the passengers in the second row of seats 104 from the vehicle's driver. FIG. 2 illustrates a pair of holes or openings on both the tubular members of part C. The partition 302 may include similarly spaced holes or protrusions that may be used to connect the two structures. Further, it will be understood that instead of the partition 302, other equipment may also be connected to this part. For example, a pull-out desk or tray may be attached to Part C. Alternatively, an entertainment console may be attached here. It will be understood that the applications stated here are merely exemplary and that any equipment or device may be vertically disposed on Part C without departing from the scope of the present disclosure.

Figure 4:
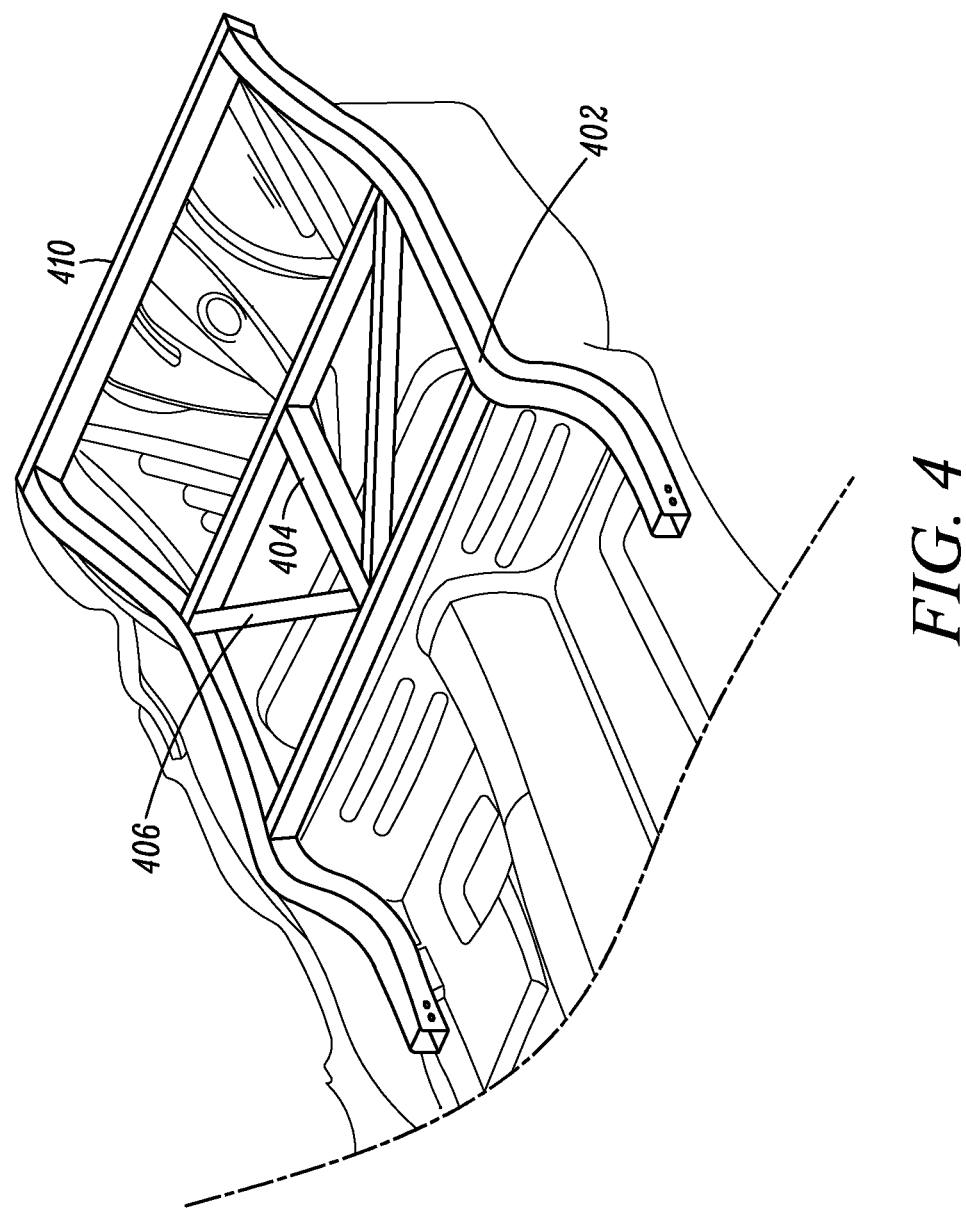
FIG. 4 illustrates an alternate embodiment of the vehicle attachment bracket depicted in FIG. 1.

It will further be understood that the design of the attachment bracket 200 may vary from that depicted in FIG. 1. FIG. 4 illustrates one other such design, in which parts A and C have the same shape and position as shown in FIGS. 2-3, but part B's structure varies significantly. Instead of two boomerang-shaped members, the design depicted in FIG. 4 includes a rectangular structure 402 along the seat floor boundary. The rectangular structure 402 is divided into two segments by a horizontal cross beam 404, with each divided segment further including a diagonal beam 406. It will be appreciated that the diagonal beam can connect any two diagonal sides of the divided segments without departing from the scope of the present disclosure. The support device illustrated here is securely bolted to the vehicle body at various locations. The attachment bracket may vary considerably from this design. For example, horizontal beams in any directions may be envisioned within the rectangular frame 402. Moreover, the frame along the backrest of the vehicle body (generally shown as 410) may also include multiple cross members or beam segments without departing from the scope of the present disclosure.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. An attachment bracket for a vehicle cabin, the vehicle cabin including a first row of seats, a second row of seats, a floor panel, and a rear panel, the attachment bracket comprising:
   a first part including a horizontal cross member extending across the rear panel;
   a second part, connected to the first part, including two or more boomerang-shaped members, the central portions of the members meeting at approximately their center and being coupled to approximately the center of the rear panel, the open ends of the members being mechanically coupled to the front and back ends of the rear panel;
   a third part, connected to the second part, including one or more arcuate tubular members extending along the floor panel from the second part towards the first row passenger seats, the third part including features to attach one or more devices at the end towards the first row passenger seats.

2. The attachment bracket of claim 1, wherein the end of the third part towards the first row passenger seats includes one or more features to connect a vertical partition screen.

3. The attachment bracket of claim 1, wherein the second part includes one or more features to engage restraining equipment.

4. The attachment bracket of claim 1, wherein the first part includes one or more features for attaching communication equipment.

5. The attachment bracket of claim 1, wherein the first part includes one or more features for attaching a cooling fan.

6. The attachment bracket of claim 1 being mechanically connected to the vehicle body at two or more points.

7. The attachment bracket of claim 1, wherein the attachment bracket is utilized in vehicles for emergency services agencies.

8. The attachment bracket of claim 1, wherein the attachment bracket is utilized in vehicles for the police services.

9. An attachment bracket mechanically coupled to a vehicle chassis for integrating vehicle components, including a second row of passenger seats, a security partition, and an accessory package in police vehicles, the attachment bracket comprising:
   a first part including a cross member across the top of a rear panel of the vehicle;
   a second part, connected to the first part, including two or more tubular segments, the second part being mechanically coupled from the front of the rear panel up to the first part; and
   a third part including two arcuate tubular segments, wherein one tubular segment is connected to a left side end of the second part and the second tubular segment is connected to a right side end of the second part, the tubular segments extend from the second towards a front row of passenger seats.

* * * * *